US009799177B2

(12) United States Patent
Baron et al.

(10) Patent No.: US 9,799,177 B2
(45) Date of Patent: Oct. 24, 2017

(54) APPARATUS AND METHODS FOR HAPTIC COVERT COMMUNICATION

(71) Applicant: Intel Corporation, Santa Clara, CA (US)

(72) Inventors: Charles Baron, Chandler, AZ (US); Jim S. Baca, Corrales, NM (US); Kevin W. Williams, Roseville, CA (US); William J. Lewis, North Plains, OR (US); Michael T. Moran, Naas (IE)

(73) Assignee: Intel Corporation, Santa Clara, CA (US)

( * ) Notice: Subject to any disclaimer, the term of this patent is extended or adjusted under 35 U.S.C. 154(b) by 299 days.

(21) Appl. No.: 14/494,407

(22) Filed: Sep. 23, 2014

(65) Prior Publication Data

US 2016/0086457 A1 Mar. 24, 2016

(51) Int. Cl.
*H04B 3/36* (2006.01)
*G08B 6/00* (2006.01)

(52) U.S. Cl.
CPC .................................... *G08B 6/00* (2013.01)

(58) Field of Classification Search
CPC .................................. G08B 1/00; G08B 6/00
USPC ............... 340/407.1, 573.1; 116/205; 701/70
See application file for complete search history.

(56) References Cited

U.S. PATENT DOCUMENTS 5,565,840 A * 10/1996 Thorner .................. A63F 13/02 340/323 R
8,552,847 B1 * 10/2013 Hill ......................... G06F 3/016 116/205
2005/0113167 A1 * 5/2005 Buchner ................ A63F 13/02 463/30
2007/0041600 A1 * 2/2007 Zachman ................ A61F 11/04 381/312
2009/0090305 A1 * 4/2009 Cheok .................... A01K 15/02 119/707
2009/0248260 A1 * 10/2009 Flanagan ................ F16H 61/24 701/51
2010/0271298 A1 * 10/2010 Vice ........................ G06F 3/011 345/156

* cited by examiner

*Primary Examiner* — Daryl Pope
(74) *Attorney, Agent, or Firm* — Schwabe, Williamson & Wyatt, P.C.

(57) ABSTRACT

Embodiments described herein relate generally to providing information through tactility. A computer system may receive an input from a user. The computer system may identify one or more locations associated with haptic elements disposed on a wearable haptic apparatus. The computer system may generate a message that includes an indication of the one or more locations. The computer system may transmit this message to the wearable haptic apparatus. The wearable haptic apparatus may actuate one or more haptic elements disposed thereon based on the indication of the one or more locations included in the message. Other embodiments may be described and/or claimed.

23 Claims, 7 Drawing Sheets

APPARATUS AND METHODS FOR HAPTIC COVERT COMMUNICATION

FIELD OF INVENTION

Embodiments of the present invention relate generally to the technical field of data processing, and more particularly, to smart haptic output devices, computer systems, and methods adapted to operate to wirelessly communicate data associated with haptic outputs.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

Wireless communication of messages, such as text messages and social media messages, are popular forms of discrete and quick communication. Such technologies allow individuals to send and receive messages without audibly communicating. However, textual communication requires hand and eye coordination, which may be impractical in some situations (e.g., driving). For example, textual communication may not be practical in situations in which a user's hands and/or eyes are focused elsewhere and/or the communication needs to be more "covert."

Certain alternative output devices, such as those designed for users with disabilities, require a learning curve to understand a coded pulse message or to read braille. While switches and pulses may be available, devices implementing such techniques for message communication require an often steep learning curve. For example, such devices require counting and translating pulses by the user.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
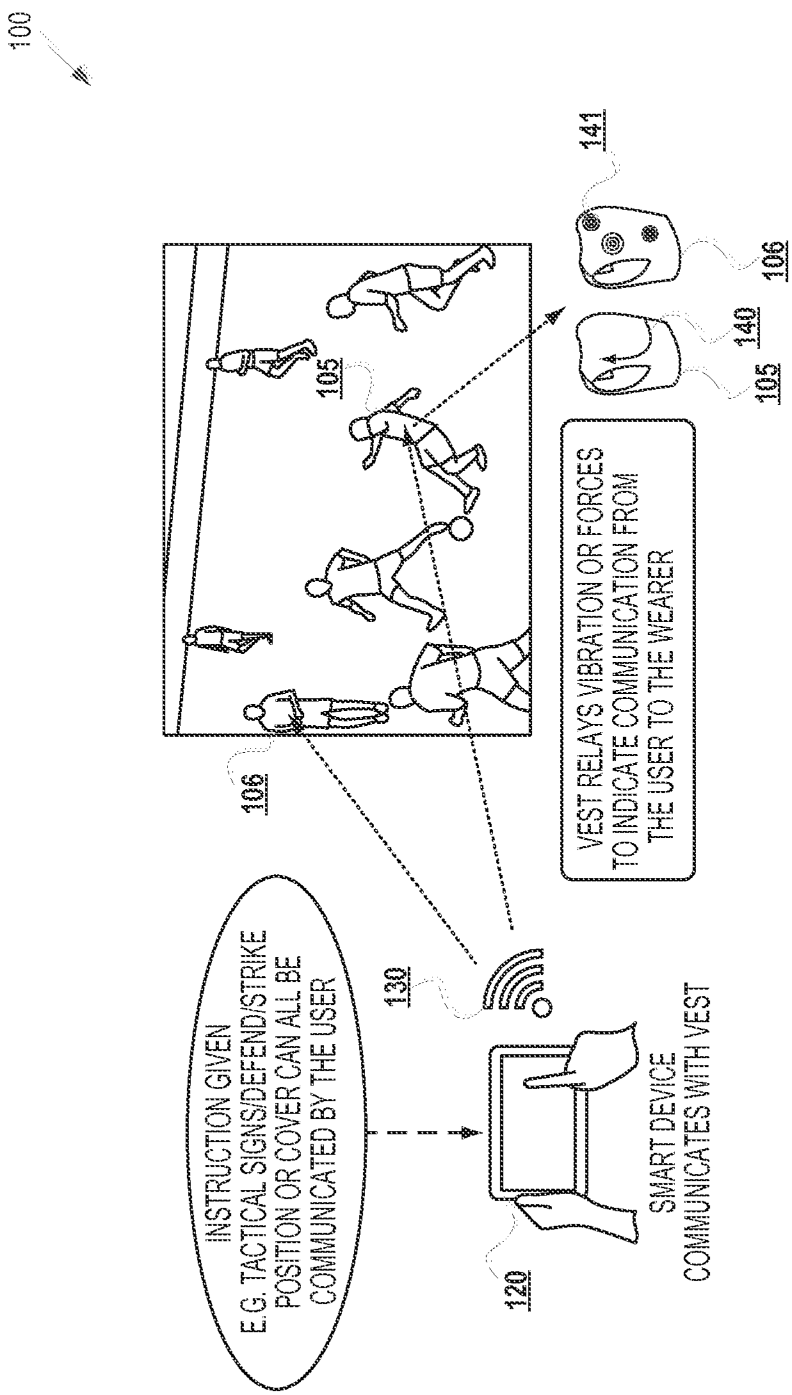
FIG. 1 is a block diagram illustrating an environment for receiving information for tactile output and outputting such information using a wearable apparatus having a plurality of haptic elements disposed thereon, in accordance with various embodiments.

Beginning first with FIG. 1, a block diagram shows one embodiment of an environment 100 for receiving information for tactile output and outputting such information using a wearable apparatus having a plurality of haptic elements disposed thereon, in accordance with various embodiments. The environment 100 may include, but is not limited to, one or more wearable apparatuses 105, 106, and a computer system 120, incorporated with the teachings of the present disclosure. Except for the teaching of the present disclosure integrated with some of the wearable apparatuses 105, 106, the wearable apparatuses 105, 106, in general, may be any type of apparatuses suitable to be worn by an individual (hereinafter, "wearer") such that at least one surface of the apparatus is disposed against the body of the wearer. By way of example, a first wearable apparatus 105 may be a vest, integrated with the teachings of the present disclosure, and a second wearable apparatus 106 may be a shirt, integrated with the teachings of the present disclosure. In other embodiments, a wearable apparatus may be, for example, a jacket, pants, shoes, a glove, a hat, or the like, integrated with the teachings of the present disclosure.

According to embodiments, the wearable apparatuses 105, 106 may have disposed thereon respective pluralities of haptic elements. A respective plurality of haptic elements may be disposed on each wearable apparatus 105, 106 such that haptic output from one or more of the haptic elements is perceptible to each wearer of each wearable apparatus 105, 106. In one embodiment, the first plurality of haptic elements may be disposed on an interior surface of a first wearable apparatus 105 to be positioned against a back of a wearer. The first plurality of haptic elements may be actuated sequentially to provide information to the wearer. For example, the first plurality of haptic elements may be actuated to trace a symbol, such as an alphanumeric symbol, and/or actuated according to a symbol, such as a first symbol 140.

The wearable apparatuses 105, 106 may be adapted to actuate respective pluralities of haptic elements based on messages, which may be wirelessly received. In one embodiment, a first wearable apparatus 105 may be adapted to receive a message that includes one or more symbols, such as alphanumeric symbols, shapes, and/or figures. The first wearable apparatus 105 may be adapted to identify a sequence of haptic elements that corresponds to the one or more symbols. For example, a first symbol may be an arrow that curves up and to the left. The first wearable apparatus 105 may be adapted to identify a sequence of haptic elements to be actuated so that the haptic elements trace the first symbol 140. Accordingly, the sequential actuation of the haptic elements may be perceptible to the wearer as an arrow that slopes upward to the left.

In another embodiment, a second wearable apparatus 106 may be adapted to receive a message that includes one or more coordinates, such as an ordered tuple (e.g., "(2,2)" to refer to a haptic element at a second row and second column) or relative coordinates (e.g., an indication corresponding to an upper leftmost haptic element). The second wearable apparatus 106 may be adapted to identify at least one and/or a sequence of haptic elements that correspond to the one or more coordinates. For example, a sequence of coordinates 141 may include three locations on the second wearable apparatus 106. The second wearable apparatus 106 may be adapted to determine a sequence of haptic elements to be actuated by the sequence of coordinates 141. Accordingly, the sequential actuation of the haptic elements may be perceptible to the wearer as sequential pulses at an upper left location, a lower middle location, and an upper right location.

In various embodiments, a message may be received from a computer system 120. Except for the teachings of the present disclosure, the computer system 120 may be, for example, a desktop computer, a laptop computer, a portable electronic computer device, a smartphone, a personal data assistant, a tablet computer, an eBook reader, or essentially any other computer device adapted to transmit signals over a network.

In embodiments, the computer system 120 may be adapted to generate messages that are to cause the wearable apparatuses 105, 106 to actuate respective haptic elements. In various embodiments, a message may include an indication of at least one location at the wearable apparatus 105, 106 that is to receive the message. The indication of the at least one location may be, for example, one or more coordinates, such as an ordered tuple (e.g., "(2,2)" to refer to a haptic element at a second row and second column) or relative coordinates (e.g., an indication corresponding to an upper leftmost haptic element).

In another embodiment, computer system 120 may be adapted to include in a message a sequence associated with the plurality of locations. For example, the computer system 120 may include a sequence of coordinates that begin at a lower right location and slope upwardly left to finish at an upper right location, which may be perceptible to a wearer as the first symbol 140.

According to various embodiments, the computer system 120 may identify the at least one location based on one or more inputs, such as touch input, speech input, and/or input received from another input device (e.g., a keyboard, mouse, etc.). For example, the computer system 120 may receive an input of an arrow sloping upwardly left and identify a sequence of locations that trace the upwardly left sloping arrow. In another example, the computer system 120 may receive an input of a symbol (e.g., an alphanumeric symbol) and identify a sequence of locations that trace the symbol.

The computer system 120 may transmit the message to one or more wearable apparatuses 105, 106 over a network 130. The network 130 may be, for example, a cellular network, a wide area network ("WAN") (e.g., the Internet), a wireless local area network ("WLAN"), and/or a personal area network ("PAN") (e.g., Bluetooth, Flashlinq, radio-frequency identification ("RFID"), Wi-Fi Direct, infrared data association ("IrDA"), and the like). In some embodiments, this communication may adhere to at least one standard, such as a standard promulgated by the 3rd Generation Partnership Project ("3GPP"). In some embodiments, the computer system 120 may be adapted to pair with the wearable apparatuses 105, 106, such as where the network 130 is a PAN. In one embodiment, the computer system 120 may transmit messages to each wearable apparatus 105, 106 individually. In another embodiment, the computer system 120 may address the wearable apparatuses 105, 106 together, such as through a common addressing scheme.

Figure 2:
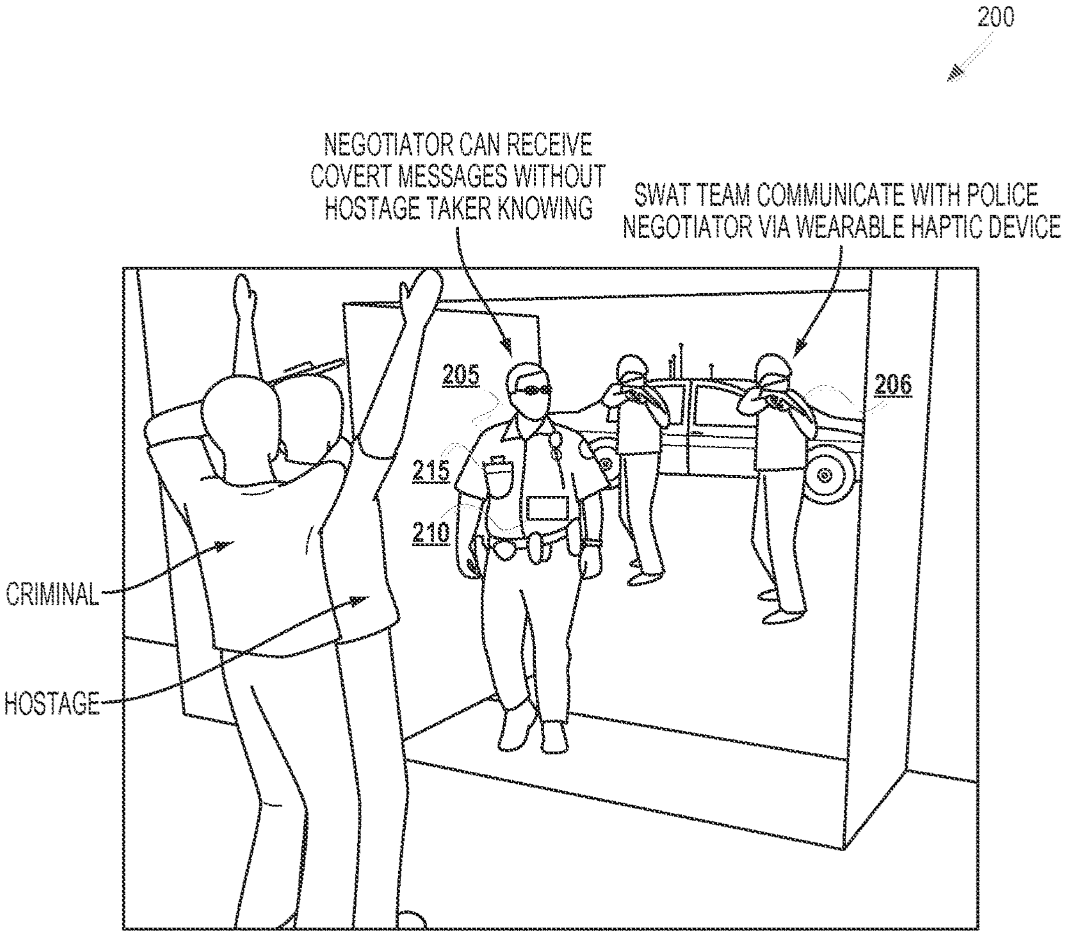
FIG. 2 is a block diagram illustrating another embodiment of an environment for receiving information for tactile output and outputting such information using a wearable apparatus having a plurality of haptic elements disposed thereon, in accordance with various embodiments.

Turning now to FIG. 2, a block diagram shows another embodiment of an environment 200 for receiving information for tactile output and outputting such information using a wearable apparatus having a plurality of haptic elements disposed thereon, in accordance with various embodiments. FIG. 1 illustrates an environment 100 in which the teachings of the present disclosure may be employed during an athletic event where the wearers of the wearable apparatuses 105, 106 are players and a user of the computer system 120 may be a coach. FIG. 2 illustrates another environment 200 in which the teachings of the present disclosure may be adapted.

In the environment 200 of FIG. 2, a criminal may be engaged in a hostage-taking situation. In such a situation, covert communication between law enforcement personnel may be advantageous. For example, a member of a Special Weapons and Tactics ("SWAT") team may be required to direct his or her attention to the criminal and, therefore, may not be able to read a communication device. Additionally, the environment 200 may include sound that impedes hearing. Thus, the SWAT team member may be able to receive information as haptic output through a wearable apparatus 206.

Similarly, a negotiator may need to remain calm and attentive toward the criminal to prevent harm to the hostage. Accordingly, the negotiator may benefit from communication that is imperceptible to the criminal. Therefore, the negotiator may benefit from receiving information as haptic output through a wearable apparatus 205.

A user of a computer device (not shown) may remain more distant from the situation, which may allow for easier observation. The computer device may be able to receive input from the user, generate one or more messages based on the input, and transmit one or more messages to one or both of the wearable apparatuses 205, 206 to discretely signal the SWAT team member and/or the negotiator.

In some embodiments, a wearable apparatus 205 may be equipped with one or more sensors 215. The sensor may be, for example, a navigation sensor, a camera, an accelerometer, a gyroscope, a thermometer, an altimeter, a microphone, or an ambient light sensor. The wearable apparatus 205 may be adapted to transmit output from such a sensor 215 to provide information to the computing device, e.g., so that the user may tailor his or her input to the situation of the wearer of the wearable apparatus 205.

According to various embodiments, the wearable apparatus 205 may further be equipped with one or more touch input surfaces 210. The touch input surface 210 may be adapted to receive tactile input, such as pressure, and transmit an indication of the tactile input to the computer device. In one embodiment, the touch input surface 210 may be adapted to receive input associated with the physiology of the wearer—e.g., the touch input surface 210 may be adapted to detect biofeedback. For example, the touch input surface 210 may be adapted to detect voice stress, body heat, pulse, adrenaline level, or various other physiological characteristics. In some embodiments, the wearable apparatus 205 may be adapted to transmit an indication of a location and/or a sequence of locations on the touch input surface 210. The wearable apparatus 205 may be adapted to transmit output from such a touch input surface 210 to provide information to the computing device.

Figure 3:
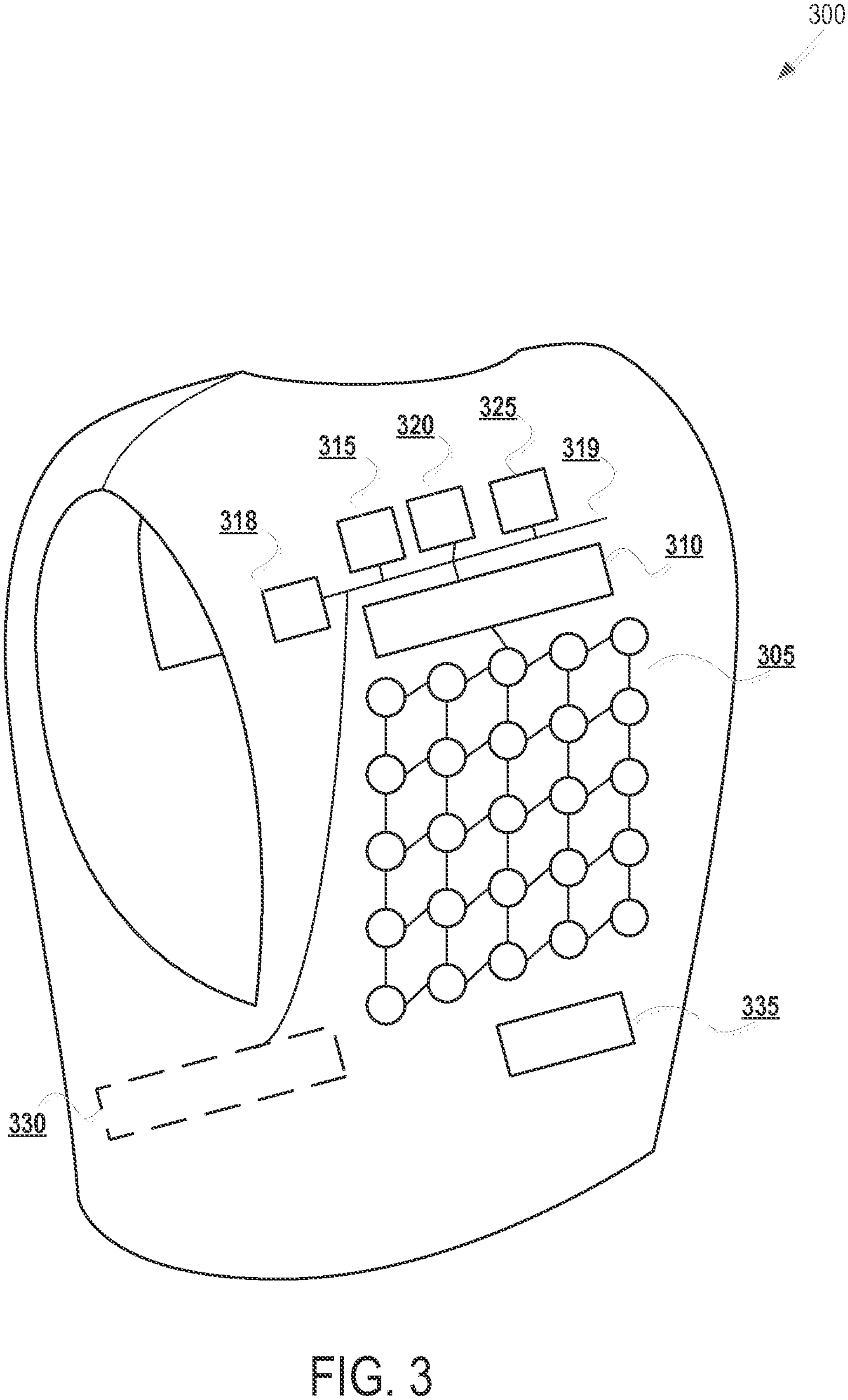
FIG. 3 is a block diagram illustrating a wearable apparatus equipped to provide information through tactility, in accordance with various embodiments.

With reference now to FIG. 3, a block diagram illustrates a wearable apparatus 300 equipped to provide information through tactility, according to various embodiments. The wearable apparatus 300 may be, for example, embodiments of the wearable apparatuses 105, 106 illustrated in FIG. 1 and/or the wearable apparatuses 205, 206 illustrated in FIG. 2. Although illustrated in FIG. 3 as a vest, various embodiments of a wearable apparatus 300 (e.g., jacket, gloves, hat, shoes, pants, etc.) are contemplated herein.

The wearable apparatus 300 may be a body that has disposed thereon a plurality of haptic elements 305, control circuitry 310, receiver circuitry 315, transmitter circuitry 320, sensor circuitry 325, touch input circuitry 330, one or more antennas 318, and/or a power supply 335. One or more of these components may be communicatively coupled through a bus 319. The bus 319 may be any subsystem adapted to transfer data within the wearable apparatus 300. The bus 319 may include a plurality of computer buses as well as additional circuitry adapted to transfer data within the wearable apparatus 300. In some embodiments, two or more of the circuitries 305-330 may be integrated with one another.

The control circuitry 310 may be adapted to actuate one or more haptic elements 305, for example, based on one or more received signals. Accordingly, the control circuitry 310 may be coupled with receiver circuitry 315 to receive the one or more signals, which may be messages to provide information to a wearer through haptic output. In one embodiment, the receiver circuitry 315 may receive a message from an external computer system (not shown), such as a computer system that is adapted to provide one or more locations of one or more haptic elements 305 that are to be actuated. In various embodiments, the message may be provided by any type of proprietary or well-known messaging technique, such as a short message service ("SMS") message, a Multimedia Messaging Service ("MMS") message, an instant message, or a social media message. In one embodiment, the message may be received according to one or more protocols, such as Bluetooth.

Based on a received message, the control circuitry 310 may be adapted to actuate one or more of the haptic elements 305, thereby allowing a wearer of the wearable apparatus 300 to receive information (e.g., one or more symbols) based on pressure or pulses from the one or more actuated haptic elements. In one embodiment, the message may include one or more symbols. The control circuitry 310 may be adapted to determine at least one haptic element correlated with the one or more symbols. For example, the one or more symbols may be one or more alphanumeric symbols. For one symbol, the control circuitry 310 may be adapted to access storage that includes information correlating the symbol to a sequence of haptic elements 305 (e.g., a lookup table that maps symbols to predetermined sequences of haptic elements 305)—e.g., for the symbol "A," the control circuitry 310 may determine a predetermined sequence of haptic elements that trace the symbol "A."

In another embodiment, the message may include an indication of a location of one or more haptic elements 305. For example, the message may comprise a sequence corresponding to a plurality of the haptic elements 305, wherein the sequence is to trace a symbol. Accordingly, the control circuitry 310 may determine the plurality of haptic elements 305 that correspond to the sequence. The control circuitry 310 may then sequentially actuate the corresponding haptic elements of the plurality 305.

In another example, the message may include an indication of coordinates (e.g., relative coordinates) corresponding to one or more haptic elements. The control circuitry may determine the plurality of haptic elements 305 that correspond to the indicated coordinates. The control circuitry 310 may then sequentially actuate the corresponding haptic elements of the plurality 305.

In various embodiments, the wearable apparatus 300 may include one or more components for reception and/or detection. In one embodiment, the wearable apparatus 300 may have disposed thereon sensor circuitry 325 that may be adapted to sense external stimuli, such as signals, light, and the like. The sensor circuitry 325 may include one or more of a navigation sensor, a camera, an accelerometer, a gyroscope, a thermometer, an altimeter, a microphone, or an ambient light sensor. The sensor circuitry 325 may be adapted to output one or more signals. In one embodiment, the control circuitry 310 may detect the one or more signals and actuate one or more haptic elements based on the signals. In another embodiment, the transmitter circuitry 320 may transmit an indication of the one or more outputted signals to a computer system (e.g., a computer system that is to provide the message) over a wireless network.

In one embodiment, the wearable apparatus 300 may include touch input circuitry 330. The touch input circuitry 330 may comprise, for example, a surface that is adapted to detect touch input, such as pressure and/or gestures (e.g., simple gestures, multi-touch gestures, and/or muscle movement, such as clenching a muscle or rotating a muscle). Based on detected pressure and/or a gesture, the touch input circuitry 330 may be adapted to output one or more signals. Based on the one or more signals, the transmitter circuitry 320 may transmit an indication of the touch input to a computer system (e.g., a computer system that is to provide the message) over a wireless network. In one embodiment, the control circuitry 310 may be adapted to identify one or more symbols based on the touch input, such as when a wearer traces a symbol on the touch input circuitry 330. The control circuitry 310 may then cause the transmitter circuitry 320 to transmit the one or more identified symbols to a computer system.

In various embodiments, the transmitter circuitry 320 and receiver circuitry 315 may include circuitry adapted for one or more protocols or interfaces. For example, the transmitter circuitry 320 and receiver circuitry 315 may include circuitry adapted for at least one of a cellular network, a WAN, a WLAN, and/or a PAN. The transmitter circuitry 320 and receiver circuitry 315 may include circuitry adapted for one or more short-range communications, such as one or more of Bluetooth, Flashlinq, RFID, Wi-Fi Direct, IrDA, and the like. In some embodiments, the transmitter circuitry 320 and receiver circuitry 315 may include circuitry adapted for communication according to at least one standard, such as a standard promulgated by 3GPP.

The transmitter circuitry 320 and receiver circuitry 315 may be coupled with one or more antennas 318. The one or more antennas 318 may enable wireless data communication over radio frequency. The one or more antennas 318 may be, for example, one or more patch antennas. In another embodiment, the one or more antennas 318 may be embedded in the body of the wearable apparatus 300. In such an embodiment, at least a portion of the body of the wearable apparatus 300 would be traversable by radio signals. According to various embodiments, a plurality of antennas 318 may be arranged to provide beam shaping.

To power the components of the wearable apparatus 300, the wearable apparatus 300 may include a power supply 335. The power supply 335 may be, for example, a battery. The power supply 335 may be of sufficient capacity to power the components of the wearable apparatus 300 for suitable duration (e.g., greater than one hour). In one embodiment, the power supply 335 may be rechargeable, such as through wireless charging. The control circuitry 310 may be coupled with the power supply 335 and may be adapted to perform some power control and/or management functions. In some embodiments, the power supply 335 may be a piezoelectric generator, a motion and/or inertial charger, a solar charger, induction charger, and one or more transformers and/or capacitors.

Figure 4:
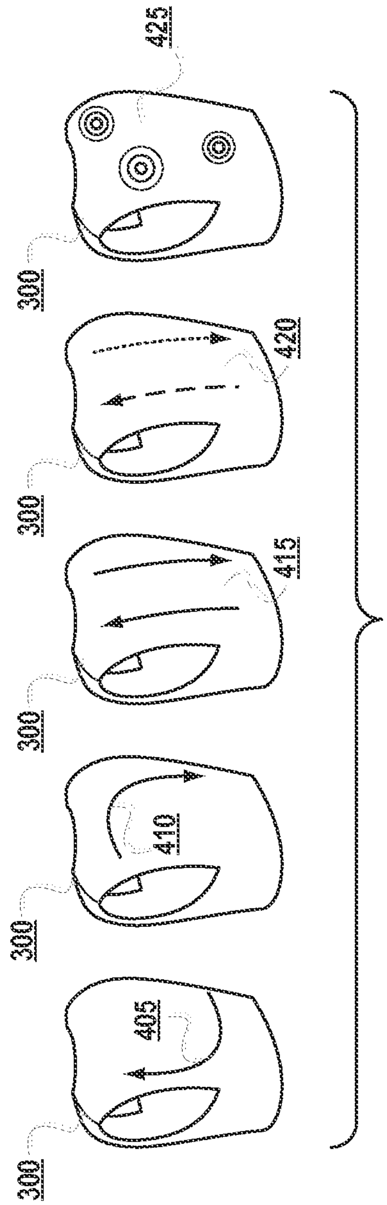
FIG. 4 is a block diagram illustrating a plurality of symbols that may be traced by actuation of haptic elements disposed on a wearable haptic apparatus, in accordance with various embodiments.

Turning to FIG. 4, a block diagram illustrates a plurality of symbols 405-425 that may be traced by actuated haptic elements, as described with respect to FIG. 3, in accordance with various embodiments. In one embodiment, a first symbol 405 may be an upwardly left sloping arrow. This first symbol 405 may be traced by actuating haptic elements of the wearable apparatus 300 in a sequence beginning with a lower rightmost haptic element and sequentially actuating haptic elements that are relatively above and leftward of the previously actuated haptic element until the upper leftmost haptic element is actuated.

In one embodiment, a second symbol 410 may be downwardly right sloping arrow. This second symbol 410 may be traced by actuating haptic elements of the wearable apparatus 300 in a sequence beginning with an upper leftmost haptic element and sequentially actuating haptic elements that are relatively lower and rightward of the previously actuated haptic element until the lower rightmost haptic element is actuated.

In another embodiment, a third symbol 415 may be an upward arrow and a downward arrow. The upward arrow of third symbol 415 may be traced by actuating haptic elements of the wearable apparatus 300 in a sequence beginning with a lowermost haptic element and sequentially actuating haptic elements that are relatively above the previously actuated haptic element until the uppermost haptic element is actuated. The downward arrow of third symbol 415 may be traced by actuating haptic elements of the wearable apparatus 300 in a sequence beginning with an uppermost haptic element and sequentially actuating haptic elements that are relatively lower than the previously actuated haptic element until the lowermost haptic element is actuated. The two arrows of the third symbol 415 may be traced simultaneously or one may be traced one after another.

In another embodiment, a fourth symbol 420 may be broken upward and downward arrows. To indicate an upward arrow with few breaks of the fourth symbol 420, a plurality (e.g., two) lower leftmost haptic elements of the wearable apparatus 300 may be actuated, followed by actuation of a plurality of haptic elements that skips at least one haptic element above the previously actuated plurality, followed by actuation of the upper leftmost haptic elements that skip at least one haptic element above the previously actuated plurality. To indicate a downward arrow with many breaks of the fourth symbol 420, an upper rightmost haptic element of the wearable apparatus 300 may be actuated, followed by actuation of a haptic element that skips at least one haptic element below the previously actuated haptic element, and so forth until actuation of the lower rightmost haptic element that skips at least one haptic element below the previously actuated haptic element. The two arrows of the fourth symbol 420 may be traced simultaneously or one may be traced after another.

In another embodiment, a fifth symbol 425 may be three disparate pulses. This fifth symbol 425 may be traced by actuating haptic elements of the wearable apparatus 300 corresponding to an upper rightmost location, a middle leftmost location, and a lower center location. The haptic elements corresponding with these locations may be actuated in any sequence (e.g., in accordance with a message) and/or one or more may be simultaneously actuated.

Figure 5:
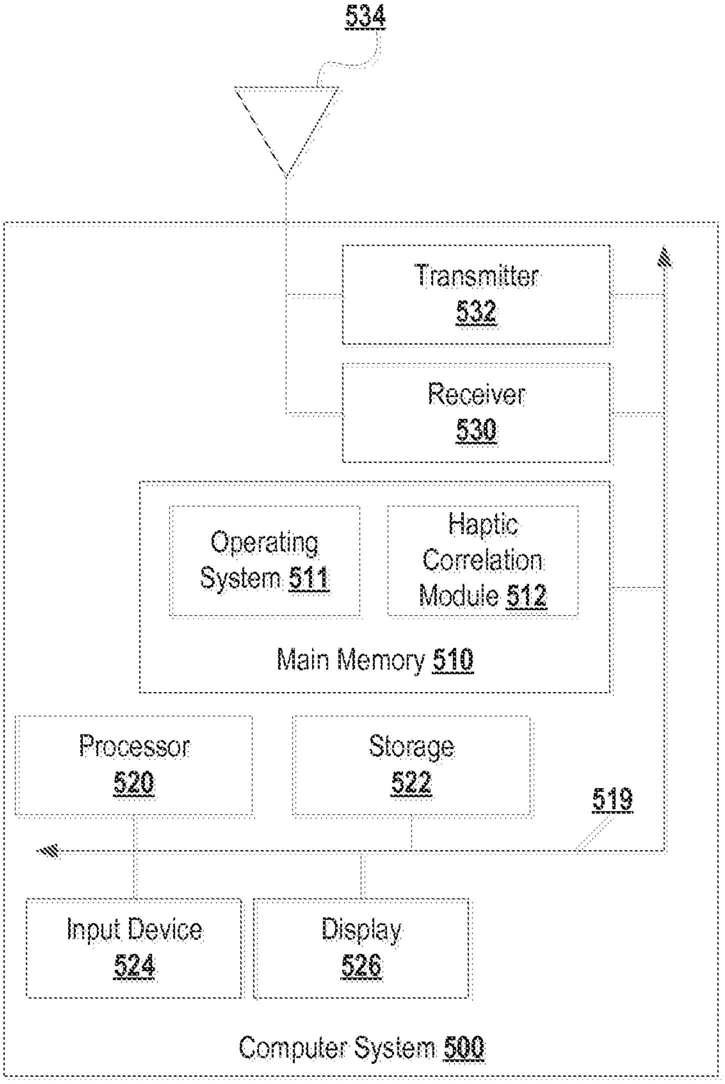
FIG. 5 is a block diagram illustrating a computer system to provide information for tactile output, in accordance with various embodiments.

With respect to FIG. 5, a block diagram is shown illustrating a computer system 500 to provide information for tactile output, in accordance with various embodiments. The computer system 500 may be or may be included in the computer system 120 of FIG. 1.

The computer system 500 may include, but is not limited to, main memory 510, storage 522, processor 520, an input device 524, display 526, a receiver 530, a transmitter 532, and/or at least one antenna 534. These components may be communicatively coupled through a bus 519. The bus 519 may be any subsystem adapted to transfer data within the computer system 500. The bus 519 may include a plurality of computer buses as well as additional circuitry adapted to transfer data within the computer system 500.

To communicate data with a wearable haptic apparatus (not shown), the computer system 500 may include a receiver 530 and a transmitter 532. In the aggregate, the receiver 530 and transmitter 532 may be transceiver circuitry or communications circuitry according to some embodiments. The receiver 530 and transmitter 532 may be communicatively coupled with one or more antennas 534 to wirelessly transmit to and receive radio signals from one or more wearable haptic apparatuses. The receiver 530 and/or transmitter 532 may be implemented in hardware, software, or a combination of the two and may include, for example, components such as a network card, network access controller, and/or other network interface controller(s).

In various embodiments, the receiver 530 and transmitter 532 may include circuitry adapted for one or more protocols or interfaces. For example, the receiver 530 and transmitter 532 may include circuitry adapted for at least one of a cellular network, a WAN, a WLAN, and/or a personal area network. For example, the receiver 530 and transmitter 532 may include circuitry adapted for one or more short-range communications, such as one or more of Bluetooth, Flashlinq, RFID, Wi-Fi Direct, IrDA, and the like. In some embodiments, the receiver 530 and transmitter 532 may include circuitry adapted for communication according to at least one standard, such as a standard promulgated by 3GPP.

The processor 520 may be any processor suitable to execute instructions, such as instructions from the main memory 510. Accordingly, the processor 520 may be, for example, a central processing unit ("CPU"), a microprocessor, or another similar processor. In some embodiments, the processor 520 includes a plurality of processors, such as a dedicated processor (e.g., a graphics processing unit), a network processor, or any processor suitable to execute operations of the computer system 500. In embodiments, the processor 520 may be single core or multi-core, with or without embedded caches.

Coupled with the processor 520 is the main memory 510. The main memory 510 may offer both short-term and long-term storage and may in fact be divided into several units (including a unit located at the processor 520). The main memory 510 may be volatile, such as static random-access memory ("SRAM") and/or dynamic random-access memory ("DRAM"), and may provide storage (at least temporarily) of computer-readable instructions, data structures, software applications, and other data for the computer system 500. Such data may be loaded from the storage 522. In embodiments, the main memory 510 may include non-volatile memory, such as Flash, Electrically Erasable Programmable Read-Only Memory ("EEPROM"), and the like. The main memory 510 may also include cache memory, which may be in addition to cache located at the processor 520. The main memory 510 may include, but is not limited to, instructions related to an operating system 511, a haptic correlation module 512, and any number of other applications that may be executed by the processor 520.

In various embodiments, the operating system 511 may be configured to initiate the execution of the instructions, such as instructions provided by the haptic correlation module 512. In particular, the operating system 511 may be adapted to serve as a platform for running the haptic correlation module 512. The operating system 511 may be adapted to perform other operations across the components of the computer system 500, including threading, resource management, data storage control, and other similar functionalities.

The operating system 511 may cause the processor 520 to execute instructions for the haptic correlation module 512. The haptic correlation module 512 may include code representing instructions configured to cause the transmitter 532 to transmit radio signals to one or more wearable haptic apparatuses and/or process radio signals received by the receiver 530 from one or more wearable haptic apparatuses. Additionally, the haptic correlation module 512 may be adapted to present, or cause to be presented, information received from one or more wearable haptic apparatuses. For example, the haptic correlation module 512 may cause the display 526 to present visual information based on information from a sensor at a wearable haptic apparatus. In another example, the haptic correlation module 512 may cause the display to present visual information based on an indication of touch input received from a wearable apparatus.

The computer system 500 may include an input device 524 to receive input from a user. The input device 524 may allow a user to interact with the computer system 500 through various means, according to different embodiments—e.g., the input device 524 may be presented to a user on a display 526 as a graphical user interface or through a command line interface. Where necessary, input from the input device 524 may be converted—e.g., where the input is received as speech input from a microphone input device 524, the input may be converted to one or more symbols through a speech-to-text application. The input device 524 may be implemented in hardware, software, or a combination of the two and may include or may be communicatively coupled with one or more hardware devices suitable for user input (e.g., a keyboard, mouse, or touch screen). Further, some or all of the instructions for the input device 524 may be executed by the processor 520.

In various embodiments, the input device 524 may be coupled with the haptic correlation module 512. The haptic correlation module 512 may receive, through the input device 524, an input. The input may be comprised of one or more symbols. Based on such a received input, the haptic correlation module 512 may identify at least one location associate with a wearable haptic apparatus.

In one embodiment, an input may be at least one symbol, such as an alphanumeric or free-form symbol (e.g., a drawing traced on a touchscreen input device 524). From the input, the haptic correlation module 512 may determine at least one location associated with a wearable haptic apparatus. According to one embodiment, the haptic correlation module 512 may determine a plurality of locations that are to correspond to a plurality of haptic elements disposed at the wearable haptic apparatus. The plurality of locations may be a sequence. In one embodiment, the haptic correlation module 512 may determine an indication of one or more coordinates (e.g., relative coordinates or ordered tuples) that are to correspond to one or more haptic elements disposed at the wearable haptic apparatus.

Based on the determination of the at least one location, the haptic correlation module may be adapted to generate a message that is to include an indication of the at least one location. In some embodiments, the haptic correlation module 512 may generate the message as an SMS message, an MMS message, an instant message, or a social media message. In one embodiment, the message may be generated according to one or more protocols, such as Bluetooth.

In various embodiments, the haptic correlation module 512 may cause the transmitter 532 to transmit the generated message to at least one wearable haptic apparatus. In various embodiments, the haptic correlation module 512 may be adapted to transmit different messages to different wearable apparatuses or the same message to different wearable haptic apparatuses.

The display 526 may be any suitable device adapted to graphically present data of the computer system 500, such as a light-emitting diode ("LED"), an organic LED ("OLED"), a liquid-crystal display ("LCD"), an LED-backlit LCD, a cathode ray tube ("CRT"), or other display technology. According to some embodiments, the display 526 may be removably coupled with the computer system 500 by, for example, a digital visual interface cable, a high-definition multimedia interface cable, etc. Alternatively, the display 526 may be remotely disposed from computer system 500, e.g., associated with a stationary service station or a mobile client device of a service person.

Figure 6:
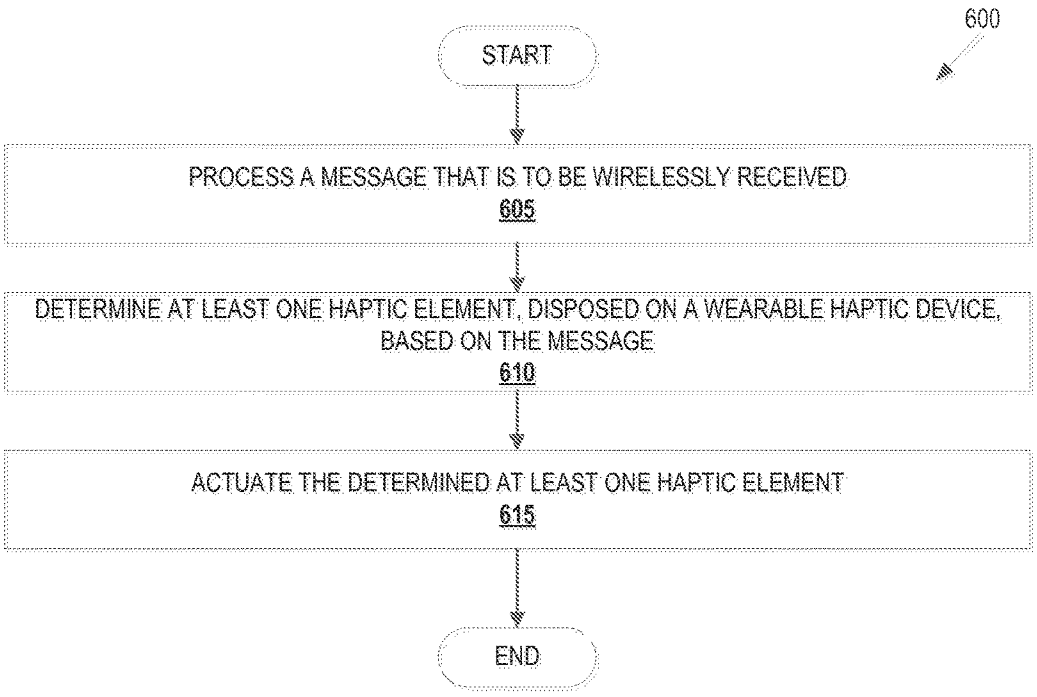
FIG. 6 is a flow diagram illustrating a method for providing information through tactility, in accordance with various embodiments.

Now with reference to FIG. 6, a flow diagram illustrates a method 600 for providing information through tactility, in accordance with various embodiments. The method 600 may be performed by a wearable apparatus, such as the wearable apparatus 300 of FIG. 3. While FIG. 6 illustrates a plurality of sequential operations, one of ordinary skill would understand that one or more operations of the method 600 may be transposed and/or performed contemporaneously.

The method 600 may include an operation 605 for processing a message that is to be wirelessly received. This message may be received over a wireless network, such as a PAN, a cellular network, or a WLAN. In some embodiments, the message may be an SMS message, an MMS message, an instant message, or a social media message. In other embodiments, the message may be received according to another protocol, such as Bluetooth or a private protocol between the wearable apparatus and an external computer system.

Thereafter, operation 610 may include determining at least one haptic element, disposed on a wearable haptic device, based on the message. The determining of operation 610 may vary according to the embodiment. In one embodiment, the message may include one or more symbols and operation 610 may include identifying at least one haptic element correlated with the one or more symbols. For example, the one or more symbols may be one or more alphanumeric symbols. For one symbol, operation 610 may include identifying a sequence of haptic elements that are correlated with the one symbol—e.g., for the symbol "A," operation 610 may include identifying a sequence of haptic elements that trace the symbol "A."

In another embodiment, the message may include an indication of one or more haptic elements. For example, the message may comprise a sequence corresponding to a plurality of haptic elements, wherein the sequence is to trace a symbol. Accordingly, operation 610 may include determining the haptic elements that correspond to the sequence. In another example, the message may include an indication of coordinates (e.g., relative coordinates) corresponding to one or more haptic elements. Operation 610 may include determining the haptic elements that correspond to the indicated coordinates.

Based on operation 610, the method 600 may include operation 615 for actuating the determined at least one haptic element. Where a plurality of haptic elements are to be actuated, operation 615 may comprise sequentially actuating those haptic elements (e.g., according to the sequence determined at operation 610), for example, thereby allowing a wearer of the wearable device to discern a symbol traced by the sequence of actuated haptic elements.

Figure 7:
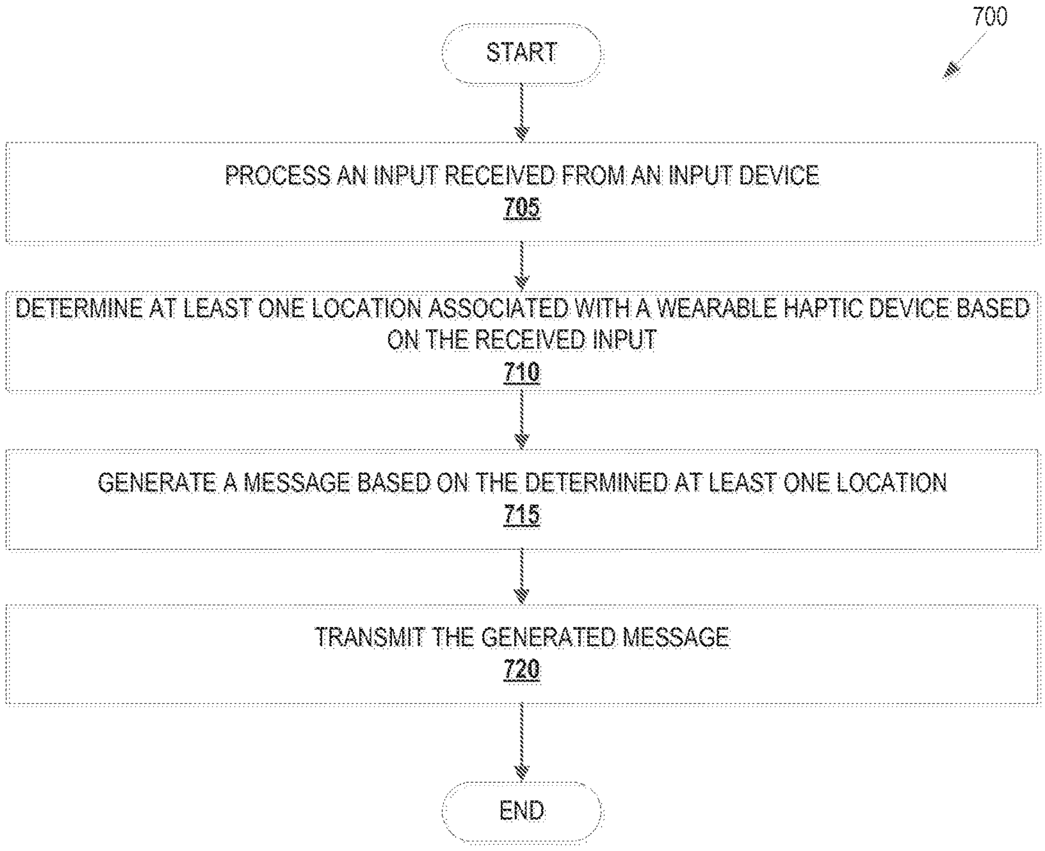
FIG. 7 is a flow diagram illustrating a method for providing information for tactile output, in accordance with various embodiments.

Now with reference to FIG. 7, a flow diagram illustrates a method 700 for providing information for tactile output, in accordance with various embodiments. The method 700 may be performed by a computer system, such as the computer system 500 of FIG. 5. The computer system 500 may be adapted to communicate with a wearable apparatus, such as the wearable apparatus 300 of FIG. 3. While FIG. 7 illustrates a plurality of sequential operations, one of ordinary skill would understand that one or more operations of the method 700 may be transposed and/or performed contemporaneously.

The method 700 may begin with operation 705 for processing an input received from an input device. The input may vary according to the embodiment. For example, the input may be at least one symbol, such as an alphanumeric symbol. In another embodiment, the symbol may be a free-form symbol, such as a drawing traced on a touchscreen input device. Where necessary, the input may be converted—e.g., where the input is received as speech input from a microphone input device, the input may be converted to one or more symbols through a speech-to-text application.

Based on operation 705, the method 700 may include operation 710 for determining at least one location associated with a wearable haptic device. According to one embodiment, operation 710 may comprise determining a plurality of locations that are to correspond to a plurality of haptic elements disposed at the wearable haptic device. The plurality of locations may be a sequence. In one embodiment, operation 710 may comprise determining an indication of one or more coordinates (e.g., relative coordinates) that are to correspond to one or more haptic elements disposed at the wearable haptic device.

The method 700 may further include operation 715 for generating a message based on the determined at least one location. In various embodiments, operation 715 may comprise generating a message that includes an indication of all of the determined locations. Operation 715 may further comprise including, in the message, an indication of a sequence associated with the one or more determined locations. Operation 715 may further include operations associated with addressing the message to the wearable haptic device—e.g., including phone number, metadata tag (e.g., hashtag), or other address associated with routing the message to the wearable haptic device. In some embodiments, the message may be an SMS message, an MMS message, an instant message, or a social media message. In other embodiments, the message may be generated according to another protocol, such as Bluetooth or a private protocol between the wearable apparatus and an external computer system.

Based on the generated message, the method 700 may reach operation 720 for transmitting the generated message. This message may be transmitted over a wireless network, such as a PAN, a cellular network, or a WLAN. The approach to transmission may be based on a technology in which the computer system is to communicate with the wearable apparatus, such as if the computer system is paired with the wearable apparatus, if the computer system is to transmit a text message, or if the computer system is to generate the message for a social media service.

In some embodiments, operation 720 may comprise transmitting the generated message to a plurality of wearable haptic devices. For example, a plurality of wearable haptic devices may be commonly addressable so that a plurality of wearable haptic devices associated with a group may receive indications of the determined one or more locations. In one embodiment, the message may be transmitted to an intermediary system, which may route the message to one or more wearable haptic devices.

In various embodiments, example 1 may include a wearable apparatus equipped to provide information through tactility, the apparatus comprising: a wearable apparatus body; a plurality of haptic elements disposed on the wearable apparatus body; receiver circuitry disposed on the wearable apparatus body to wirelessly receive a message; control circuitry, coupled with the receiver circuitry and the plurality of haptic elements, and disposed on the wearable apparatus body, to actuate at least one of the haptic elements based on the received message. Example 2 may include the wearable apparatus of example 1, wherein the wearable apparatus is a vest, jacket, or shirt. Example 3 may include the wearable apparatus of example 2, wherein the plurality of haptic elements are disposed on an interior surface of the wearable apparatus body to be positioned against a back of a user. Example 4 may include the wearable apparatus of any of examples 1-3, wherein the message comprises an indication of a sequence of haptic elements, and further wherein the control circuitry is to actuate the plurality of haptic elements according to the indicated sequence. Example 5 may include the wearable apparatus of any of examples 1-3, wherein the message comprises a symbol, and further wherein the control circuitry is to identify a sequence corresponding to the symbol and sequentially actuate the plurality of haptic elements according to the identified sequence. Example 6 may include the wearable apparatus of example 5, wherein the symbol is an alphanumeric symbol. Example 7 may include the wearable apparatus of any of examples 1-3, further comprising: sensor circuitry, coupled with the control circuitry, and disposed on the wearable apparatus body, to output a signal. Example 8 may include the wearable apparatus of example 7, wherein the sensor circuitry includes at least one of a navigation sensor, a camera, an accelerometer, a gyroscope, a thermometer, an altimeter, a microphone, or an ambient light sensor. Example 9 may include the wearable apparatus of example 7, wherein the control circuitry is to actuate at least one of the haptic elements based on the signal outputted by the sensor circuitry. Example 10 may include the wearable apparatus of example 7, wherein the control circuitry is to cause transmitter circuitry to wirelessly transmit an indication of the sensor circuitry signal to an external computer system, and the apparatus further comprising: the transmitter circuitry, coupled with the control circuitry, and disposed on the wearable apparatus body. Example 11 may include the wearable apparatus of any of examples 1-3, wherein the control circuitry is to cause transmitter circuitry to wirelessly transmit an indication of a touch input, and the apparatus further comprises: the transmitter circuitry, coupled with the control circuitry, disposed on the wearable apparatus body; and touch input circuitry, coupled with the control circuitry, and disposed on the wearable apparatus body, to detect the touch input. Example 12 may include the wearable apparatus of any of examples 1-3, wherein the control circuitry is to identify at least one symbol based on the detected touch input, and further wherein the indication is based on the identified at least one symbol. Example 13 may include the wearable apparatus of any of examples 1-3, wherein the message includes an indication of a location, and the control circuitry is to actuate the at least one haptic element that corresponds to the location. Example 14 may include the wearable apparatus of any of examples 1-3, wherein the receiver circuitry is to wirelessly receive the message over at least a personal area network, a cellular network, or a wireless local area network.

In various embodiments, example 15 may include a computer system to provide information for tactile output, the computer system comprising: an input device to receive an input; a haptic correlation module, coupled to the input device, to identify at least one location associated with a wearable haptic device based on the received input and to generate a message based on the identified at least one location; and a transmitter, coupled with the haptic correlation module, to transmit the generated message. Example 16 may include the computer system of example 15, wherein the haptic correlation module is to identify a sequence associated with the wearable haptic device that includes the at least one location. Example 17 may include the computer system of example 15, wherein the haptic correlation module is to identify at least one output based on an indication of a haptic input, and the computer system further comprises: a receiver, coupled with the haptic correlation module, to wirelessly receive the indication of the haptic input from the wearable haptic device; and a display, coupled with the haptic correlation module, to present the at least one output. Example 18 may include the computer system of any of examples 15-17, wherein the haptic correlation module is to generate the message as a short message service ("SMS") message, a Multimedia Messaging Service ("MMS") message, an instant message, or a social media message. Example 19 may include the computer system of any of examples 15-17, wherein the transmitter is to transmit the generated message to a plurality of wearable haptic devices. Example 20 may include the computer system of any of examples 15-17, wherein the computer system is a smartphone, a personal data assistant, or a tablet computer.

In various embodiments, example 21 may include one or more non-transitory computer-readable media comprising computing device-executable instructions, wherein the instructions, in response to execution by a wearable computing device, cause the wearable computing device to: process a message that is to be wirelessly received; determine at least one haptic element, disposed on a wearable haptic device, based on the message; and actuate the determined at least one haptic element. Example 22 may include the one or more non-transitory computer-readable media of example 21, wherein the message comprises an indication of a sequence of haptic elements disposed on the wearable haptic device. Example 23 may include the one or more non-transitory computer-readable media of example 21, wherein the message comprises a symbol, and the determination of the at least one haptic element based on the message comprises to: identify a plurality of haptic elements disposed on the wearable haptic device that are to be sequentially actuated.

In various embodiments, example 24 may be one or more non-transitory computer-readable media comprising executable instructions, wherein the instructions, in response to execution by a computer system, cause the computer system to: process an input received from an input device coupled with the computing device; determine at least one location associated with a wearable haptic device based on the received input; generate a message based on the determined at least one location; and transmit the generated message. Example 25 may include the one or more non-transitory computer-readable media of example 24, wherein the message is a short message service ("SMS") message, a Multimedia Messaging Service ("MMS") message, an instant message, or a social media message.

In various embodiments, example 26 may be a wearable haptic apparatus comprising: means for wirelessly receiving a message; means for identifying at least one haptic element, disposed on the wearable haptic apparatus, based on the message; and means for actuating the identified at least one haptic element. Example 27 may include the wearable haptic apparatus of example 26, wherein the message comprises an indication of a sequence of haptic elements disposed on the wearable haptic device. Example 28 may include the wearable haptic apparatus of example 26, wherein the message comprises a symbol, and the means for identifying the at least one haptic element based on the message comprises: means for identifying a plurality of haptic elements disposed on the wearable haptic device that are to be sequentially actuated. Example 29 may include the wearable haptic apparatus of any of examples 26-28, further comprising: means for sensing external stimuli and outputting a signal based on the sensing. Example 30 may include the wearable haptic apparatus of example 29, wherein the actuating means comprises: means for actuating at least one haptic element based on the outputting of the signal. Example 31 may include the wearable haptic apparatus of example 29, further comprising: means for wirelessly transmitting an indication of the signal to an external computer system. Example 32 may include the wearable haptic apparatus of any of examples 26-28, further comprising: means for detecting touch input; and means for wirelessly transmitting an indication of the touch input.

In various embodiments, example 33 may be a method for providing information through tactility, the method comprising: wirelessly receiving, by a wearable haptic apparatus, a message; identifying at least one haptic element, disposed on the wearable haptic apparatus, based on the message; and actuating the identified at least one haptic element. Example 34 may include the method of example 33, wherein the message comprises an indication of a sequence of haptic elements disposed on the wearable haptic device. Example 35 may include the method of example 33, wherein the message comprises a symbol, and the identifying of the at least one haptic element based on the message comprises: identifying a plurality of haptic elements disposed on the wearable haptic device that are to be sequentially actuated. Example 36 may include the method of any of examples 33-35, further comprising: sensing external stimuli; outputting a signal based on the sensing. Example 37 may include the wearable haptic apparatus of any of examples 33-35, further comprising: detecting touch input; and wirelessly transmitting an indication of the touch input.

In various embodiments, example 38 may be a method comprising: receiving, by a computing system, an input received from an input device; determining at least one location associated with a wearable haptic device based on the received input; generating a message based on the determined at least one location; and wirelessly transmitting the generated message. Example 39 may include the method of example 38, wherein the determining of the at least one location comprises: determining a sequence associated with the wearable haptic device that includes the at least one location. Example 40 may include the method of any of examples 38-40, wherein the message is a short message service ("SMS") message, a Multimedia Messaging Service ("MMS") message, an instant message, or a social media message.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory ("ROM"), random access memory ("RAM"), magnetic disk storage media, optical storage media, flash memory devices). Embodiments described herein may also include storage that is in a cloud (e.g., remote storage accessible over a network), which may be associated with the Internet of Things ("IoT"). In such embodiments, data may be distributed across multiple machines (e.g., computing systems and/or IoT devices), including a local machine.

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A wearable apparatus equipped to provide information through tactility, the apparatus comprising:

a wearable apparatus body;

a plurality of haptic elements on or in the wearable apparatus body;

receiver circuitry disposed on the wearable apparatus body, the receiver circuitry to wirelessly receive a first message, wherein the first message includes a first indication to indicate a location that corresponds to at least one haptic element of the plurality of haptic elements;

touch input circuitry disposed on the wearable apparatus body, the touch input circuitry to detect a touch input via a touch input surface of the touch input circuitry;

transmitter circuitry disposed on the wearable apparatus body, the transmitter circuitry to wirelessly transmit a second message, wherein the second message includes a second indication to indicate the touch input; and control circuitry in or on the wearable apparatus body, the control circuitry coupled with the receiver circuitry, the transmitter circuitry, the touch input circuitry, and the plurality of haptic elements, wherein the control circuitry is to control actuation of the at least one haptic element based on the location indicated by the received first message and control the transmitter circuitry to wirelessly transmit the second message.

2. The wearable apparatus of claim 1, wherein the wearable apparatus is a vest, jacket, or shirt.

3. The wearable apparatus of claim 2, wherein the plurality of haptic elements are disposed on an interior surface of the wearable apparatus body to be positioned against a back of a user.

4. The wearable apparatus of claim 1, wherein the first indication is to indicate a sequence of haptic elements, and wherein the control circuitry is to control actuation of the plurality of haptic elements according to the indicated sequence.

5. The wearable apparatus of claim 1, wherein the first indication comprises a symbol, and wherein the control circuitry is to identify a sequence corresponding to the symbol and sequentially actuate the plurality of haptic elements according to the identified sequence.

6. The wearable apparatus of claim 5, wherein the symbol is an alphanumeric symbol.

7. The wearable apparatus of claim 1, further comprising:

sensor circuitry, coupled with the control circuitry, and disposed on the wearable apparatus body, to output a signal.

8. The wearable apparatus of claim 7, wherein the sensor circuitry includes at least one of a navigation sensor, a camera, an accelerometer, a gyroscope, a thermometer, an altimeter, a microphone, or an ambient light sensor.

9. The wearable apparatus of claim 7, wherein the control circuitry is to actuate one or more haptic elements of the plurality of haptic elements based on the signal output by the sensor circuitry.

10. The wearable apparatus of claim 7, wherein:

the control circuitry is to cause the transmitter circuitry to wirelessly transmit, to an external computer system, a third indication to indicate the signal output by sensor circuitry.

11. The wearable apparatus of claim 1, wherein the control circuitry is to identify at least one symbol based on the detected touch input, and wherein the second indication is based on the identified at least one symbol.

12. The wearable apparatus of claim 1, wherein:

the receiver circuitry is to wirelessly receive the first message over at least a personal area network, a cellular network, or a wireless local area network;

the transmitter circuitry is to wirelessly transmit the second message over at least the personal area network, the cellular network, or the wireless local area network; and the first message and the second message are a short message service ("SMS") message, a Multimedia Messaging Service ("MMS") message, an instant message, or a social media message.

13. A computer system to provide information for tactile output, the computer system comprising:

an input device to receive an input;

a haptic correlation module, coupled to the input device, to identify at least one location on a wearable haptic device based on the received input, and generate a first message, wherein the first message is to indicate activation of at least one haptic element in or on the wearable haptic device based on the identified at least one location;

a transmitter, coupled with the haptic correlation module, the transmitter to transmit the generated first message for activation of the at least one haptic element; and a receiver, coupled with the haptic correlation module, the receiver to receive a second message, wherein the second message is to indicate a touch input produced by the wearable haptic device.

14. The computer system of claim 13, wherein the haptic correlation module is to identify a sequence associated with the wearable haptic device that includes the at least one location.

15. The computer system of claim 13, wherein:

the haptic correlation module is to identify at least one output based on an indication of a haptic input;

the receiver is to wirelessly receive the indication of the haptic input from the wearable haptic device; and the computer system further comprises a display, coupled with the haptic correlation module, the display to present the at least one output.

16. The computer system of claim 13, wherein the first message and second message are a short message service ("SMS") message, a Multimedia Messaging Service ("MMS") message, an instant message, or a social media message.

17. The computer system of claim 13, wherein the transmitter is to transmit or broadcast the generated first message to a plurality of wearable haptic devices.

18. The computer system of claim 13, wherein the computer system is a smartphone, a personal data assistant, or a tablet computer.

19. One or more non-transitory computer-readable media comprising computing device-executable instructions, wherein the instructions, in response to execution by a wearable computing device, cause the wearable computing device to:

determine, based on location information indicated by a wirelessly received message, at least one haptic element in or on a wearable haptic device;

control actuation of the determined at least one haptic element;

obtain a touch input from touch input circuitry of the wearable haptic device; and control wireless transmission of another message, wherein the other message includes an indication of the touch input.

20. The one or more non-transitory computer-readable media of claim 19, wherein the message comprises an indication of a sequence of haptic elements in or on the wearable haptic device, and wherein the instructions, in response to execution by the wearable computing device, cause the wearable computing device to control actuation of the haptic elements according to the sequence.

21. The one or more non-transitory computer-readable media of claim 19, wherein the message comprises a symbol, and to determine the at least one haptic element based on the message, the instructions, in response to execution by the wearable computing device, cause the wearable computing device to:

identify a plurality of haptic elements disposed on the wearable haptic device that are to be sequentially actuated.

22. One or more non-transitory computer-readable media comprising executable instructions, wherein the instructions, in response to execution by a computer system, cause the computer system to:

process an input received from an input device coupled with the computer system;

determine at least one location on a wearable haptic device based on the received input;

generate a message, wherein the message is to cause actuation of at least one haptic element in or on the wearable haptic device at the determined at least one location;

control transmission of the generated message to the wearable haptic device;

control receipt of another message from the wearable haptic device, wherein the other message is to indicate a touch input provided by the wearable haptic device; and control display of a visual representation of the touch input.

23. The one or more non-transitory computer-readable media of claim 22, wherein the message and the other message are a short message service ("SMS") message, a Multimedia Messaging Service ("MMS") message, an instant message, or a social media message.

* * * * *